(12) United States Patent
Potharaju (10) Patent No.: US 9,136,978 B2
(45) Date of Patent: Sep. 15, 2015

(54) SYSTEMS AND METHODS FOR ENHANCING SPECTRAL EFFICIENCY IN A COMMUNICATION NETWORK

(75) Inventor: Shailender Potharaju, Santa Clara, CA (US)

(73) Assignee: Redline Innovations Group Inc., Markham, Ontario (CA)

( * ) Notice: Subject to any disclaimer, the term of this patent is extended or adjusted under 35 U.S.C. 154(b) by 494 days.

(21) Appl. No.: 13/492,896

(22) Filed: Jun. 10, 2012

(65) Prior Publication Data

US 2013/0329774 A1   Dec. 12, 2013

(51) Int. Cl.
*H04B 3/46*   (2015.01)
*H04L 1/00*   (2006.01)

(52) U.S. Cl.
CPC .............. *H04L 1/0015* (2013.01); *H04L 1/002* (2013.01)

(58) Field of Classification Search
CPC .................. H04L 2025/03426; H04L 1/0026; H04L 1/0024; H04L 1/246; H04L 1/247; H04L 1/0003; H04L 25/0224; H04L 25/0204; H04L 27/2602; H04L 27/34; H04L 1/0002; H04L 1/0009; H04L 27/3863; H04L 2025/03363; H04L 5/143; H04L 1/0015; H04L 27/12; H04L 27/2626; H04B 7/0669; H04W 24/02

USPC ........... 375/267, 260, 299, 308; 370/280, 321
See application file for complete search history.

(56) References Cited

U.S. PATENT DOCUMENTS

| 5,764,699 | A | 6/1998 | Needham et al. |
|---|---|---|---|
| 7,590,181 | B2 | 9/2009 | Awad et al. |
| 7,889,703 | B2 | 2/2011 | Yang et al. |
| 8,098,601 | B2 | 1/2012 | Cai et al. |
| 8,687,566 | B2 * | 4/2014 | Maas et al. .................... 370/329 |
| 2007/0207742 | A1 * | 9/2007 | Kim et al. ....................... 455/69 |

* cited by examiner

*Primary Examiner* — Rahel Guarino
(74) *Attorney, Agent, or Firm* — Nixon Peabody LLP (57) ABSTRACT

A communication system configured to enhance communication spectral efficiency while maintaining an acceptable level of system robustness. Various combinations of modulation, code rate, and antenna usage scheme, are combined to create a hierarchy of modulation and communication schemes (MCS), such that each higher MCS level represents an enhanced degree of spectral efficiency, traded off for a lowered degree of system robustness. Included also are embodiments of methods testing the quality of data transmission and reception at difference MCS levels, and then raising or lowering MCS levels in order to enhance communication spectral efficiency while not falling below the minimally acceptable level of system robustness.

19 Claims, 7 Drawing Sheets

SYSTEMS AND METHODS FOR ENHANCING SPECTRAL EFFICIENCY IN A COMMUNICATION NETWORK

BACKGROUND

Channel conditions in communication systems vary over time. Such variances occur in all communication systems, and may be marked particularly in systems in which subscriber stations are moving. Spectral efficiency is a very important aspect of all communication systems. Conservative algorithms for modulation and coding schemes (MCS) may lead to lower throughput rates. Aggressive algorithms for MCS may lead to higher packet loss and retransmissions. Although the bits-per-Hz efficiency is higher with aggressive modulation algorithms, retransmissions may indirectly lower the overall spectral efficiency of the system. Best link adaptation algorithms define optimal MCS and optimal antenna methods to be used for data transmission for each individual subscriber, depending upon channel conditions between the Base station and the subscriber station.

Various link adaptation algorithms are available today, based on the received signal strength (RSSI) and Signal to Noise ratio (SNR). A transmitter must rely on channel conditions (such as RSSI/SNR) reported by the receiver, but channel conditions vary dramatically in any communication system, and particularly when a subscriber station is moving. Channel measurement reports from the receiver are periodic. In changing environments, particularly but not solely in mobile environments, when channel is fading, a report received from the receiver may not be appropriate by the time MCS is estimated and the transmission takes place. If the channel conditions have improved, then the selected MCS may result in lower throughput and spectral efficiency until the next report is received. If the channel conditions have worsened, then the selected MCS may result in lot of transmission errors and retransmissions. Increase in transmission errors and retransmissions may, at the higher layers, be realized as high packet latency and a lower throughput of the system.

Another issue with current adaption algorithms is that the receiver estimates the channel conditions based on the size of the received data burst. Channel estimated on a smaller burst may not be valid for a larger burst, since the RSSI/SNR measurement is usually stronger on smaller burst. This is especially true in uplink transmissions received from the subscriber station, since uplink transmissions are typically constrained by available power limitations. This is true even in case of an adaptive white Gaussian noise (AWGN) channel. Sometimes in dense urban environments, channel conditions estimated by the receiver may be wrong, due to high multipath fading.

Another issue with current adaptation algorithms is often seen with TCP-type of flow in communication systems. If the rate chosen is higher, this may cause initial packet loss to TCP stream. If the problem is sufficiently severe, the TCP may not even start.

BRIEF SUMMARY

One embodiment is a communication system operative to calibrate rates at which data is transmitted. In some embodiments, such a system would include a communication receiver. In some embodiments, such a system would include a communication transmitter, configured to (i) transmit to the receiver a short transmission using a first set of communication parameters operative to facilitate a first rate of data transmission that is higher than recently achieved rate of data transmission associated with a recently used set of communication parameters of a previous transmission, (ii) determine that there are substantially no errors associated with reception of the short transmission by the receiver, and (iii) transmit to the receiver a long transmission using a second set of communication parameters operative to facilitate a second rate of data transmission that is higher than the recently achieved rate of data transmission, but is lower than the rate of data transmission associated with the short transmission.

One embodiment is a method for increasing modulation and coding schemes in a communication system. In some embodiments of such a method, a transmitter transmits, to a receiver, a short transmission using a first modulation and coding scheme that is two levels above a recently used modulation and coding scheme known to have produced stable communication between said transmitter and said receiver. In some embodiments of such a method, the system determines that there are substantially no errors associated with reception of the short transmission by the receiver, thereby supporting a decision to increase modulation and coding scheme of following transmissions above the recently used modulation and coding scheme known to have produced stable communication between said transmitter and said receiver. In some embodiments of such a method, the transmitter transmits, to the receiver, a long transmission having a second modulation and coding scheme that is only one level above the recently used modulation and coding scheme known to have produced stable communication between said transmitter and receiver, thereby statistically facilitating a substantially error-free reception of the long transmission by the receiver. In one alternative embodiment, steps of the method proceed in the order described above, meaning transmission of a short transmission as described, determination there are substantially no errors as described above, and transmission of a long transmission as described above.

In an alternative embodiment, the order of the steps above is altered, in which the first step is transmission of a short transmission as described, the second step is transmission of a long transmission as described above, and the third step is determination there are substantially no errors as described above.

One embodiment is a method for increasing rates at which data is transmitted in a communication system. In some embodiments of such a method, a transmitter transmits, to a receiver, a short transmission created utilizing a first set of two communication parameters that are different than a previous set of two communication parameters recently utilized in creation of stable communication between said transmitter and receiver, wherein each of the two communication parameters of the first set is operative to increase rates at which data is transmitted from the transmitter to the receiver. In some embodiments of such a method, the system determines that there are substantially no errors associated with reception of the short transmission by the receiver, thereby supporting a decision to increase rates at which data is transmitted in following transmissions. In some embodiments of such a method, the transmitter transmits, to the receiver, a long transmission created utilizing a second set of two communication parameters, wherein (i) first of said communication parameters of the second set is equal to the first of the communication parameter of the first set, but (ii) the second of said communication parameter of the second set is equal to the second of the communication parameter of the previous set, thereby statistically assuring an error-free reception of the long transmission by the receiver. In one alternative embodiment, steps of the method proceed in the order described above, meaning transmission of a short transmission as described, determination there are substantially no errors as described above, and transmission of a long transmission as described above.

In an alternative embodiment, the order of the steps above is altered, in which the first step is transmission of a short transmission as described, the second step is transmission of a long transmission as described above, and the third step is determination there are substantially no errors as described above.

One embodiment is a method for calibrating rates at which data is transmitted in a communication system. In some embodiments of such a method, a transmitter transmits, to a receiver, a short transmission using a first set of communication parameters operative to facilitate a first rate of data transmission that is higher than recently achieved rate of data transmission associated with a recently used set of communication parameters of a previous transmission. In some embodiments of such a method, the system determines that there are substantially no errors associated with reception of the short transmission by the receiver, thereby supporting a decision to increase rates of data transmission above the rate of the recently achieved rate of data transmission associated with the a recently second set of communication parameters of a previous transmission. In some embodiments of such a method, the transmitter transmits, to the receiver, a long transmission of a previous transmission using a second set of communication parameters operative to facilitate a second rate of data transmission that is higher than the recently achieved rate of data transmission, but is lower than the rate of data transmission associated with the short transmission, thereby statistically facilitating a substantially error-free reception of the long transmission by the receiver. In one alternative embodiment, steps of the method proceed in the order described above, meaning transmission of a short transmission as described, determination there are substantially no errors as described above, and transmission of a long transmission as described above.

In an alternative embodiment, the order of the steps above is altered, in which the first step is transmission of a short transmission as described, the second step is transmission of a long transmission as described above, and the third step is determination there are substantially no errors as described above.

BRIEF DESCRIPTION OF THE DRAWINGS

Embodiments of the present invention are herein described, by way of example only, with reference to the accompanying drawings. With specific reference now to the drawings, it is stressed that the particulars shown are by way of example and for purposes of illustrative discussion of embodiments of the present invention only, and are presented in order to provide what is believed to be the most useful and readily understood description of the principles and conceptual aspects of embodiments of the present invention. In this regard, no attempt is made to show structural details of embodiments in more detail than is necessary for a fundamental understanding of the invention. In the drawings.

DETAILED DESCRIPTION

Current link adaptation schemes based on RSSI/SNR work well in communication environments where the channel conditions are stable and non-fading. This is the case with some fixed environments, but only at particular points of time, and not at other points of time. This is not the case with mobile or portable environments. In those environments, at those times, when channel conditions are stable and non-fading, current link adaptation schemes based on RSSI/SNR allow relatively correct channel measurements. In other environments, current link adaptation schemes based on RSSI/SNR do not allow relatively correct channel measurements. Incorrect channel measurements may lead to higher packet loss, and degradation in system performance.

In contrast to current link adaptation schemes, an error-based approach can work well in any communication environment, since the channel measurement with such an approach is not based on preamble or data pilots, and is instead based purely on the accuracy of data transmissions.

Some embodiments present an approach based on received frame errors and retransmissions, typically at Layer 2, but also possibly at other layers. In comparison to prior art based on link adaptation schemes, this approach responds to channel conditions faster, achieves desired Packet Error Rate (PER) more effectively, and increases overall spectral efficiency of the system. Further, this approach works very well with TCP like flows. This approach outperforms other SNR/RSSI based algorithms in both static and mobile environments.

Some embodiments include new algorithms for uplink and downlink communication, including for communication in OFDM and OFDMA based systems. Some embodiments are based on these new algorithms, and use error statistics to determine optimal Modulation coding scheme supported by the channel. The specific error statistics used may be packet error statistics, but other kinds of statistics are also possible and are used in various embodiments. Some of the embodiments use hardware such as an 802.16e WiMAX Base station system, but this is an example only, and the actual system may be wireless or wireline of any kind, provided that communication channels are created between some kind of transmitting station and at least one receiving unit.

In addition to new algorithms based on transmission packet errors driven purely by data transmissions, the new algorithms may also address such issues as power control, implementation of sub-channelization mechanism possibly at the edge of coverage, or derive optimal antenna method (SISO, STC and MIMO) to maximize the spectral efficiency.

Figure 1:
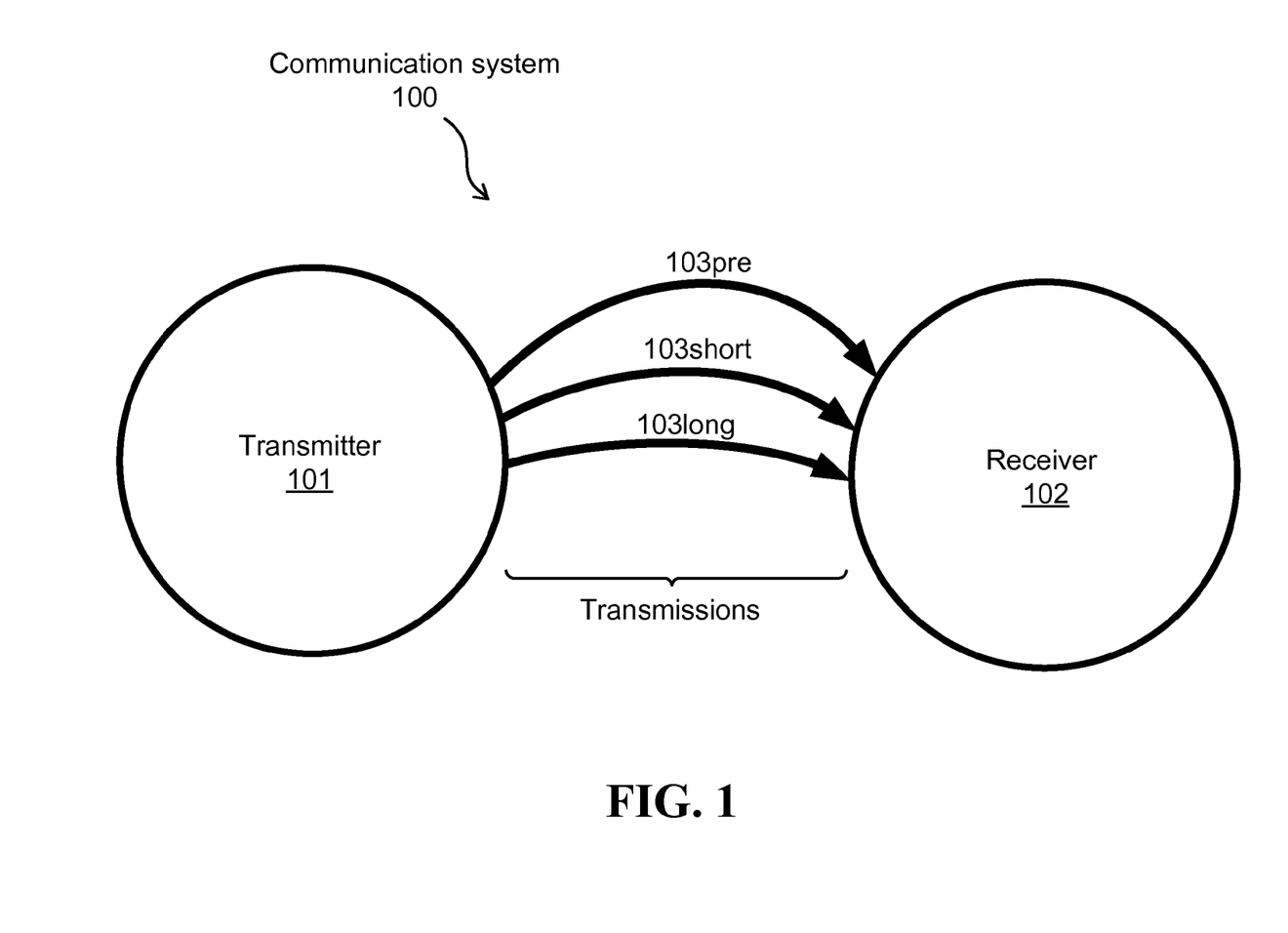
FIG. 1 illustrates one embodiment of components in a communication system, including a communication transmitter, a communication receiver, and three different phases of transmissions from the transmitter to the receiver.

FIG. 1 illustrates one embodiment of components in a communication system 100, including a communication transmitter 101, a communication receiver 102, and three different phases of transmissions from the transmitter to the receiver 103pre, 103short, and 103long. In FIG. 1, the transmitter 101 transmits to a receiver 102. This is a communication system 100 that may be portable, mobile, fixed, or any combination of these three. In some embodiments, there are three phases of transmissions, which include transmission 103pre prior to initiation of fluctuations in MCS levels, short transmission 103short which is relatively short transmission that includes a two-level jump the MCS level, and relatively long transmission 103long which is a longer transmission than the short transmission and which is performed at an MCS level that is one level higher than the 103pre level and one level lower than the 103short level. The method involving these three phases of transmissions is explained further in relation to FIG. 3A, below.

Figure 2A:
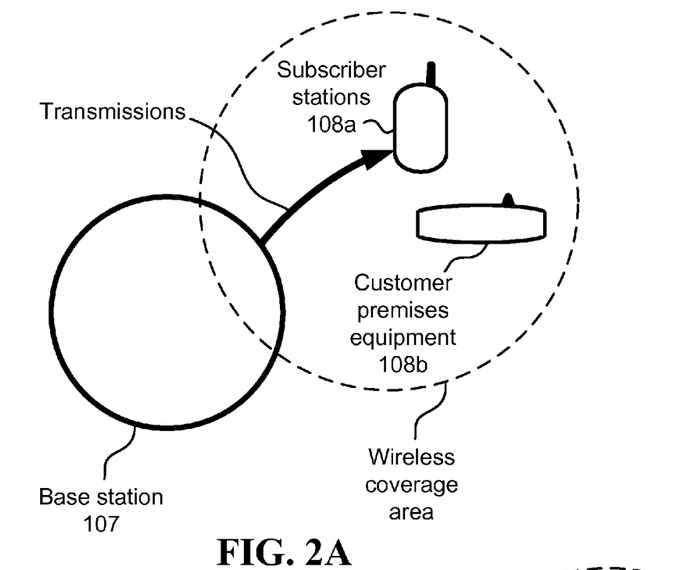
FIG. 2A illustrates one embodiment of components in a communication system, including a base station configured to transmit, wireless subscriber stations configured to receive, and non-wireless customer premises equipment configured to receive.

FIG. 2A illustrates one embodiment of components in a communication system, including a base station 107 configured to transmit, wireless subscriber stations 108a configured to receive, and non-wireless customer premises equipment 108b configured to receive. There is a particular area of coverage, denoted at "Wireless coverage area" in FIG. 2A, although as noted, the system may be wireless, wireline, or any combination of wireless and wireline. At the particular time illustrated in FIG. 2A, base station 107 is transmitting to subscriber stations 108a, although at other times not shown the base station 107 may be transmitting to the customer premises equipment 108b.

Figure 2B:
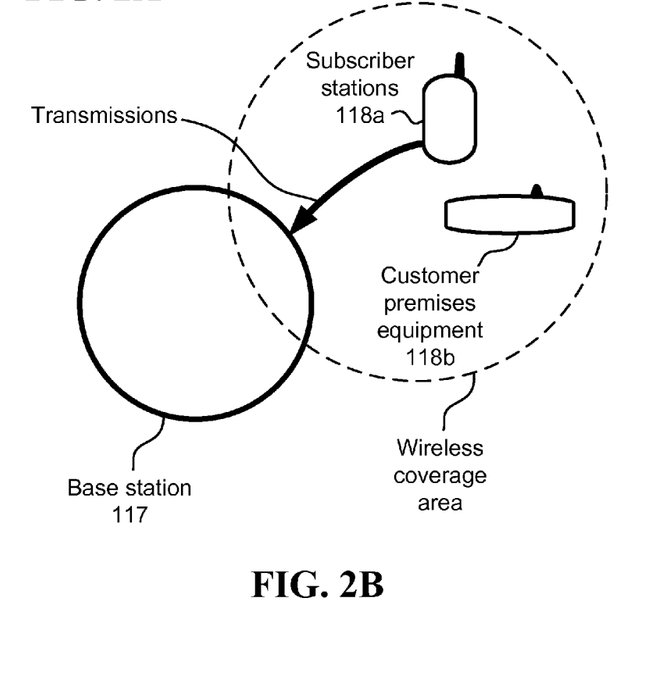
FIG. 2B illustrates one embodiment of components in a communication system, including a base station configured to receive, wireless subscriber stations configured to transmit, and non-wireless customer premises equipment configured to transmit.

FIG. 2B illustrates one embodiment of components in a communication system, including a base station 117 configured to receive, wireless subscriber stations 118a configured to transmit, and non-wireless customer premises equipment 118b configured to transmit. There is a particular area of coverage, denoted at "Wireless coverage area" in FIG. 2B, although as noted, the system may be wireless, wireline, or any combination of wireless and wireline. At the particular time illustrated in FIG. 2B, base station 117 is receiving a transmission from subscriber stations 118a, although at other times not shown the base station 117 may be receiving transmission from the customer premises equipment 118b.

Figure 3A:
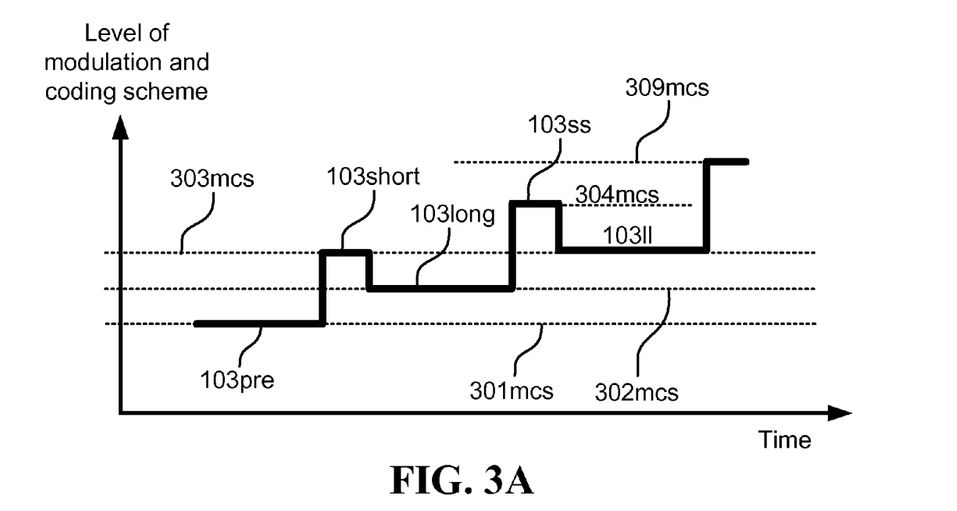
FIG. 3A illustrates one embodiment of a method for calibrating the level of a modulation and coding scheme, in which transmissions occur at different times and different scheme levels.
Figure 3B:
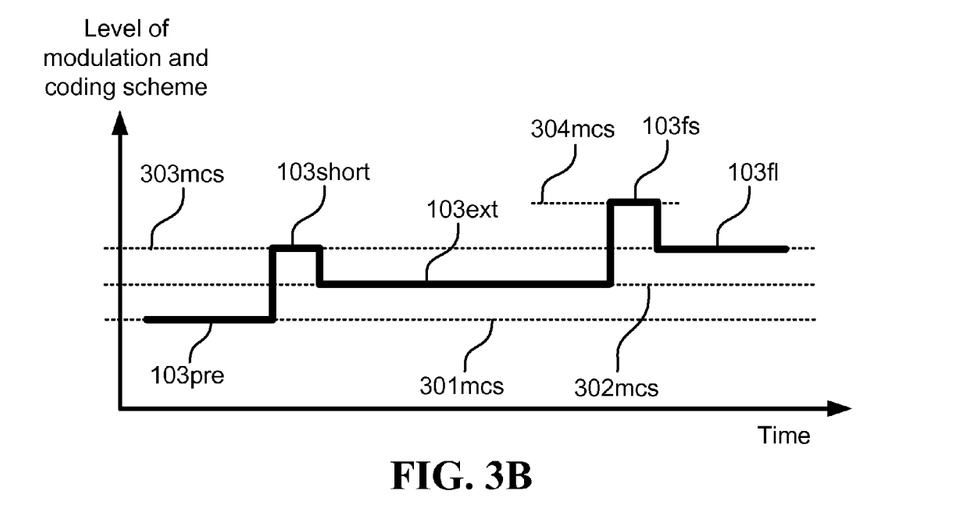
FIG. 3B illustrates one embodiment of a method for calibrating the level of a modulation and coding scheme, in which transmissions occur at different times and different scheme levels.

FIG. 3A illustrates one embodiment of a method for calibrating the level of a modulation and coding scheme (MCS), in which transmissions occur at different times and different scheme levels. The level of the MCS is shown on the y-axis, and time is shown on the x-axis. Five MCS levels are shown in FIG. 3A, which are 301mcs, then a level higher 302mcs, then a level higher 303mcs, then a higher level 304mcs, then a substantially optimal level 309mcs. It will be understood that the method is not limited to five levels, and in fact there may be three MCS levels, or four MCS levels, or six MCS levels, or any number of MCS levels above six.

One embodiment is a communication system 100 operative to calibrate rates at which data is transmitted. Such a system may include a receiver 102 to receive data transmissions. Such a system may also include a transmitter 101 to transmit data transmissions. In some embodiments, such a transmitter 101 may be configured to: (i) transmit to the receiver 102 a short transmission 103short, using a first set of communication parameters operative to facilitate a first rate of data transmission that is higher than recently achieved rate of data transmission associated with a recently used set of communication parameters of a previous transmission, (ii) determine that there are substantially no errors associated with reception of the short transmission by the receiver, and (iii) transmit to the receiver a long transmission 103long using a second set of communication parameters operative to facilitate a second rate of data transmission that is higher than the recently achieved rate of data transmission, but is lower than the rate of data transmission associated with the short transmission 103short. The configuration may include repeating a short transmission 103ss and repeating a long transmission 103ll until a substantially optimal modulation and coding scheme 309mcs is reached.

The term "substantially no errors", here and in all embodiments, includes any of three scenarios of errors in data transmission:

First, there are either no errors, or the PER ("packet error rate") is so low as to be substantially imperceptible and thus of no consequence.

Second, there is a non-insignificant PER, but decoding and correction algorithms can reconstruct the original transmission so that either no or an insubstantial amount of information is lost.

Third, there is a non-significant PER, and decoding and correction algorithms cannot reconstruct all of the lost or corrupted information, but the amount of information lost or corrupted is within tolerance; therefore, even at this level of PER, the data quality is acceptable.

All of these scenarios are within the scope of the term "substantially error-free". The phrase, "substantially error-free" is equivalent to the phrase "substantially no errors", and includes also the three scenarios of errors in data transmission noted immediately above.

In one alternative embodiment of such a system to calibrate rates at which data is transmitted, the communication system 100 includes WiMAX transmissions.

In one alternative embodiment of such a system to calibrate rates at which data is transmitted, the communication system 100 includes LTE transmissions.

In one alternative embodiment of such a system to calibrate rates at which data is transmitted, the communication system 100 includes WiFi transmissions.

In one alternative embodiment of such a system to calibrate rates at which data is transmitted, in which the communication system 100 includes any of WiMAX transmissions, LTE transmissions, and WiFi transmissions, the transmitter 101 is a kind of base station 107, and there are one or more receivers which may be wireless subscriber stations 108a, fixed customer premises equipment 108b, or both wireless subscriber stations 108a and fixed customer premises equipment 108b.

In one alternative embodiment of such a system to calibrate rates at which data is transmitted, in which the communication system 100 includes any of WiMAX transmissions, LTE transmissions, and WiFi transmissions, the receiver 102 is a kind of base station 117, and there are one or more transmitters which may be wireless subscriber stations 118a, fixed customer premises equipment 118b, or both wireless subscriber stations 118a and fixed customer premises equipment 118b.

In one alternative embodiment of such a system to calibrate rates at which data is transmitted, the communication system 100 utilizes a transmission scheme that includes DMT.

In one alternative embodiment of such a system to calibrate rates at which data is transmitted, the communication system 100 utilizes a transmission scheme that includes DSL.

In one alternative embodiment of such a system to calibrate rates at which data is transmitted, the communication system 100 utilizes a transmission scheme that includes orthogonal frequency division multiplexing (OFDM).

In one alternative embodiment of such a system to calibrate rates at which data is transmitted, the communication system 100 utilizes a transmission scheme that includes orthogonal frequency division multiple access (OFDMA).

In one alternative embodiment of such a system to calibrate rates at which data is transmitted, the data is transmitted according to the data over cable service interface specification (DOCSIS).

One embodiment is a method for calibrating modulation and coding schemes in a communication system 100. In some embodiments, a transmitter 101 transmits to a receiver 102 a short transmission 103short, using a first modulation and coding scheme 303mcs that is two levels above a recently used modulation and coding scheme 301mcs known to have produced stable communication between the transmitter 101 and the receiver 102. In some embodiments, the communication system 100 determines that there are substantially no errors associated with reception of the short transmission 103short by the receiver 102, thereby supporting a decision to increase modulation and coding scheme of following transmissions above the recently used modulation and coding scheme 301mcs known to have produced stable communication between the transmitter 101 and the receiver 102. In some embodiments, the transmitter 102 transmits to the receiver 102 a long transmission 103long having a second modulation and code scheme 302mcs that is only one level above the recently used modulation and coding scheme 301mcs known to have produced stable communication between the transmitter 101 and the receiver 102, thereby statistically facilitating a substantially error-free reception of the long transmission 103long by the receiver 102.

In some embodiments of the method just described for calibrating modulation and coding schemes in a communication system 100, the transmitter 101 first transmits the short transmission 103short, then system 100 determines there are substantially no errors in the short transmission 103short, then the transmitter 101 transmits the long transmission 103long to the receiver 102.

In some embodiments of the method just described for calibrating modulation and coding schemes in a communication system 100, the transmitter 101 first transmits the short transmission 103short, then the transmitter 101 transmits the long transmission 103long to the receiver 102, then the system 100 determines there are substantially no errors in the short transmission 103short.

In a first alternative embodiment of the method just described for calibrating modulation and coding schemes in a communication system, the method further includes (i) transmitting a short transmission 103ss, (ii) determining that there are substantially no errors, and (iii) transmitting a long transmission 103ll, until a substantially optimal modulation and coding scheme 309mcs is reached.

In a second alternative embodiment of the method just described for calibrating modulation and coding schemes in a communication system 100, the method further includes (i) determining that there is at least one error associated with reception of the short transmission 103short by the receiver 102, and (ii) consequently transmitting, by the transmitter 101, to the receiver 102, a long transmission having a second modulation and coding scheme that has the same level as the modulation and coding scheme 301mcs known to have produced stable communication between the transmitter 101 and the receiver 102, thereby statistically not risking transmission at a modulation and coding scheme that would have resulted in an error.

In a third alternative embodiment of the method just described for calibrating modulation and coding schemes in a communication system 100, the method further includes (i) determining that there is at least one error associated with reception of the short transmission 103short by the receiver 102, and (ii) consequently transmitting, by the transmitter 101, to the receiver 102, an extended transmission 103ext having a second modulation and coding scheme 302mcs that is only one level above the recently used modulation and coding scheme 301mcs known to have produced stable communication between the transmitter 101 and the receiver 102, wherein the extended transmission 103ext has a longer period than the long transmission 103long, thereby forcing the transmitter 101 to wait longer before trying to increase again the modulation and coding scheme.

In one possible configuration of the third alternative embodiment just described, the method further includes (i) determining that there are substantially no errors associated with reception of the extended transmission 103ext by the receiver 102, (ii) transmitting, by a transmitter 101, to a receiver 102, a following short transmission 103fs using a third modulation and coding scheme 304mcs that is two levels above the modulation and coding scheme 302mcs of the extended transmission 103ext, (iii) determining that there are substantially no errors associated with reception of the following short transmission 103fs by the receiver 102, thereby supporting a decision to increase modulation and coding scheme of following transmissions, (iv) transmitting, by the transmitter 101 to the receiver 102, a following long transmission 103fl having the first modulation and coding scheme 303mcs that is only one level above the modulation and coding scheme 302mcs of the extended transmission 103ext, thereby statistically facilitating an error-free reception of the following long transmission 103fl by the receiver 102.

In a fourth alternative embodiment of the method just described for calibrating modulation and coding schemes in a communication system 100, method further includes (i) the modulation of the first modulation and coding scheme 303mcs is one level above the modulation of the recently used modulation and coding scheme 301mcs known to have produced stable communication between the transmitter 101 and the receiver 102, and (ii) the coding of the first modulation and coding scheme 303mcs is one level above the coding of the recently used modulation and coding scheme 301mcs known to have produced stable communication between the transmitter 101 and the receiver 102, in such a manner that the first modulation and coding scheme 303mcs is two levels above the recently used modulation and coding scheme 301mcs known to have produced stable communication between the transmitter 101 and the receiver 102.

In one possible configuration of the fourth alternative embodiment just described, the method further includes (i) the modulation of the first modulation and coding scheme 303mcs is quadrature phase shift keying (QPSK), and (ii) the modulation of the recently used modulation and coding scheme 301mcs known to have produced stable communication between the transmitter 101 and the receiver 102 is binary phase shift keying (BPSK).

In a second possible configuration of the fourth alternative embodiment just described, the method further includes (i) the coding of the first modulation and coding scheme is of rate two thirds, and (ii) the coding of the recently used modulation and coding scheme 301mcs known to have produced stable communication between the transmitter 101 and the receiver 102 is of rate one half.

In a third possible configuration of the fourth alternative embodiment just described, (i) the modulation of the first modulation and coding scheme is 16 quadrature amplitude modulation (QAM-16), and (ii) the modulation of the recently used modulation and coding scheme 301mcs known to have produced stable communication between the transmitter 101 and the receiver 102 is quadrature phase shift keying (QPSK).

In a fourth possible configuration of the fourth alternative embodiment just described, (i) the coding of the first modulation and coding scheme is of rate three quarters, and (ii) the coding of the recently used modulation and coding scheme 301mcs known to have produced stable communication between the transmitter 101 and the receiver 102 is of rate two thirds.

In a fifth possible configuration of the fourth alternative embodiment just described, (i) the modulation of the first modulation and coding scheme is 64 quadrature amplitude modulation (QAM-64), and (ii) the modulation of the recently used modulation and coding scheme 301mcs known to have produced stable communication between the transmitter 101 and the receiver 102 is 16 quadrature amplitude modulation (QAM-16).

In a sixth possible configuration of the fourth alternative embodiment just described, (i) the coding of the first modulation and coding scheme is of rate five sixth, and (ii) the coding of the recently used modulation and coding scheme 301mcs known to have produced stable communication between the transmitter 102 and the receiver 102 is of rate three quarters.

In a fifth alternative embodiment of the method described for calibrating modulation and coding schemes in a communication system 100, the method further includes the step of transmitting the long transmission 103long starts before the step of determining that there are substantially no errors associated with reception of the short transmission 103short, such that the determination that there are substantially no errors occurs during the long transmission 103long.

Implementing the steps of the fifth alternative embodiment in the order just described may be necessary in a case where the transmitter 101 knows about errors in the short transmission 103short only after the short transmission 103short has long been completed, therefore the information of the failure may be available to the transmitter 101 only during the next phase—which is the long transmission 103long. This would typically be the case in a frame-based bi-directional communication, where it takes time for the receiver 102 to indicate to the transmitter 101 about such failure in the short transmission 103short.

In a first possible configuration of the fifth alternative embodiment just described, the method further includes not extending the period of the long transmission 103ext, as a result of the determination that there are substantially no errors associated with reception of the short transmission 103short.

In one possible variation of the first possible configuration of the fifth alternative embodiment just described, the method further includes transmitting, by the transmitter 101 to the receiver 102, a second short transmission 103ss using a third modulation and coding scheme 304mcs that is two levels above the modulation and coding scheme 302mcs of the long transmission 103long, thereby starting a process operative to increase, again, modulation and coding schemes of the communication system 100.

In a second possible variation of the first possible configuration of the fifth alternative embodiment just described, the method further includes (i) determining that there is at least one error associated with reception of the long transmission 103long, and (ii) lowering the modulation and coding scheme associated with following transmissions.

In a second possible configuration of the fifth alternative embodiment just described, the method further includes extending the period of the long transmission to create an extended transmission 103ext, after and as a result of a failure to determine that there are substantially no errors associated with reception of the short transmission 103short.

In one possible variation of the second possible configuration of the fifth alternative embodiment just described, the method further includes transmitting, by the transmitter 101 to the receiver 102, a second short transmission 103fs using a third modulation and coding scheme 304mcs that is two levels above the modulation and coding scheme 302mcs of the extended transmission 103ext, thereby starting a process operative to increase, again, modulation and coding schemes of the communication system 100.

In a second possible variation of the second possible configuration of the fifth alternative embodiment just described, the method further includes (i) determining that there is at least one error associated with reception of the extended transmission 103ext, and (ii) lowering the modulation and coding scheme associated with following transmissions.

One embodiment is a method for calibrating rates at which data is transmitted in a communication system 100. In some embodiments, a transmitter 101 transmits to a receiver 102, a short transmission 103short created utilizing a first set of two communication parameters that are different than a previous set of two communication parameters recently utilized in creation of stable communication between the transmitter 101 and the receiver 102, wherein each of the two communication parameters of the first set is operative to increase rates at which data is transmitted from the transmitter 101 to the receiver 102. In some embodiments, the communication system 100 determines that there are substantially no errors associated with reception of the short transmission 103short by the receiver 102, thereby supporting a decision to increase rates at which data is transmitted in following transmissions. In some embodiments, the transmitter 102 transmits to the receiver 102, a long transmission 103long created utilizing a second set of two communication parameters, in which (i) the first of the communication parameters of the second set is equal to the first of the communication parameter of the first set, but (ii) the second of the communication parameters of the second set is equal to the second of the communication parameter of the previous set, thereby statistically facilitating an error-free reception of the long transmission 103long by the receiver 102.

In a first alternative embodiment of the method just described for calibrating rates at which data is transmitted in a communication system 100, the method further includes (i) the first communication parameter for each of the sets of communication parameters is a code rate, and (ii) the second communication parameter for each of the sets of communication parameters is a level of multiple-input multiple-output (MIMO) antenna scheme used in transmitting data from the transmitter 101 to the receiver 102.

In a second alternative embodiment of the method just described for calibrating rates at which data is transmitted in a communication system 100, the method further includes (i) the first communication parameter for each of the sets of communication parameters is a modulation level, and (ii) the second communication parameter a is code rate.

In a third alternative embodiment of the method just described for calibrating rates at which data is transmitted in a communication system 100, the method further includes (i) the first communication parameter for each of the sets of communication parameters is a code rate, and (ii) the second communication parameter for each of the sets of communication parameters is a level of multiple-input multiple-output (MIMO) antenna scheme used in transmitting data from the transmitter 101 to the receiver 102.

In a fourth alternative embodiment of the method just described for calibrating rates at which data is transmitted in a communication system 100, the method further includes (i) the first communication parameter for each of the sets of communication parameters is a modulation level or a code rate, and (ii) the second communication parameter for each of the sets of communication parameters is selected from a group consisting of first, a level of multiple-input multiple-output (MIMO) antenna scheme used in transmitting data from the transmitter to the receiver, and second, the inverse of power density.

Figure 4:
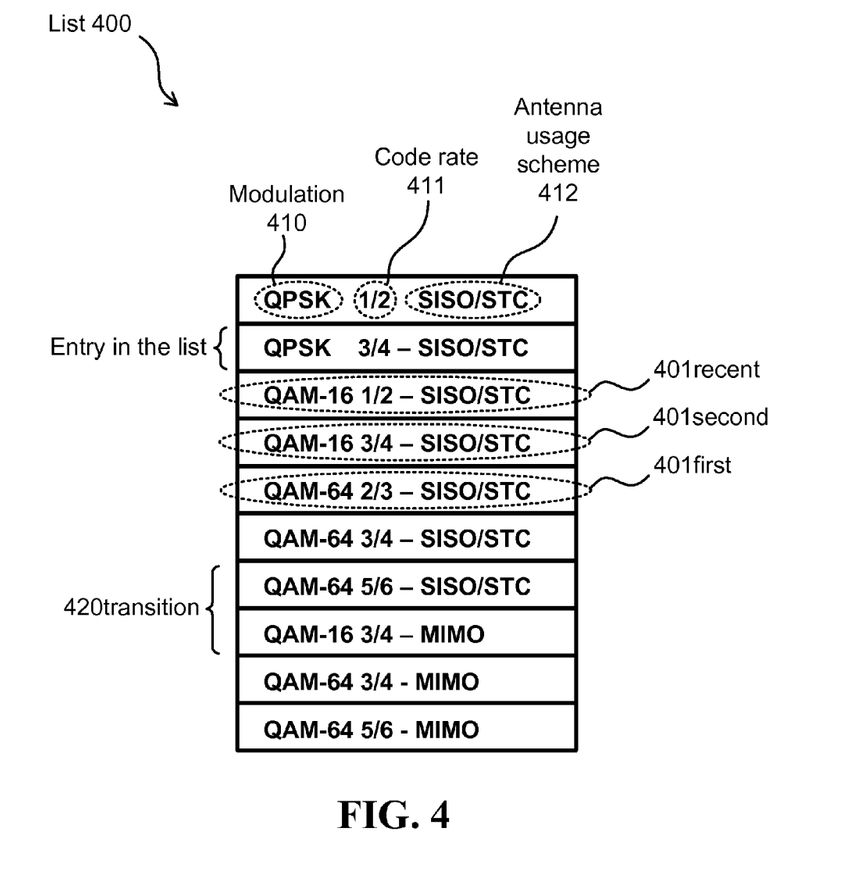
FIG. 4 illustrates a table with entries representing the type of modulation, the code rate, and the antenna usage scheme.

FIG. 4 illustrates a list 400 with entries including the type of modulation 410, the code rate 411, and the antenna usage scheme 412. FIG. 4 shows ten entries in the list, in which each horizontal block represents an entry. Each entry includes at least three components, which are (i) modulation 410, here shown as the options of QPSK, QAM-16, and QAM 64, although any other modulations could be shown, (ii) code rates 411, shown here as ½, ⅔, ¾, and ⅚, although the list could include any other code rate equal to or less than 1.00, and (iii) antenna usage scheme 412, here shown as either SISO/STC or MIMO, although other combinations, such as one to many or many to one, would also be possible.

Each entry in FIG. 4 is an MCS level. The lowest MCS level is modulation QPSK, code rate ½, and antenna usage scheme SISO/STC, shown at the top of the list FIG. 4. Of the ten entries shown in FIG. 4, this entry, at the top of the list, presents the poorest level of spectral efficiency, meaning the lowest level of data rate transmission for a given spectrum and link budget. However, this entry also represents the highest level of data robustness, meaning the highest level of data quality for data received by the receiver, of the ten entries shown in FIG. 4. Quality is determined by various checks done at the receiver or at a functional unit that receives data from the receiver.

After the lowest MCS level, meaning QPSK, ½, and SISO/STC, which has the lowest spectral efficiency but the highest data robustness, one level up, meaning greater spectral efficiency but lower data robustness, would be QPSK, ¾, and SISO/STC, which is shown as the second from the top entry in FIG. 4. The next higher MCS level is QAM-16, ½, and SISO/STC, meaning there is higher spectral efficiency then the second level, but lower data robustness than the second level. In general, of the various options for modulation 410, code rate 411, and antenna usage scheme 412, shown in FIG. 4, the top entry is the lowest MCS level, and each succeeding lower entry is one higher MCS level, with higher spectral efficiency but lower data robustness than the lower levels.

An example of an application of the list 400 according to some embodiments, may be shown by considering three entries. Let us assume three MCS levels, including QAM-16, ½, SISO/STC, called in FIG. 4 401recent, QAM-16, ¾, SISO/STC, called in FIG. 4 401second, and QAM-64, ⅔, SISO/STC, called in FIG. 4 401first. These three MCS levels might be compared to 401recent as 301mcs, 401first as 303mcs, and 401second as 302mcs, in one of many possible examples. In this particular example, there is a preliminary transmission at 301mcs, which might be 401recent QAM-16, ½, SISO/STC, the transmitter then jumps two MCS levels to 303mcs, which might be 401first QAM-64, ⅔, SISO/STC where there will be a short transmission 103short, and the transmitter will then drop one MCS level to 302mcs, which might be QAM-16, ¾, SISO/STC for either a long transmission 103long or an extended transmission 103ext. This example may be repeated, with necessary changes, at any of the MCS levels represented by the ten entries in FIG. 4. Indeed, FIG. 4 could be expanded to include many other possible combinations of modulations, code rates, and antenna usage schemes, provided that there is an order of the entries such that various embodiments will jump or drop different MCS levels as represented by the entry levels in FIG. 4.

One embodiment is a method for calibrating rates at which data is transmitted in a communication system 100. In some embodiments a transmitter 101 transmits to a receiver 102, a short transmission 103short using a first set of communication parameters operative to facilitate a first rate of data transmission that is higher than recently achieved rate of data transmission associated with a recently used set of communication parameters of a previous transmission 103pre. In some embodiments, the communication system 100 determines that there are substantially no errors associated with reception of the short transmission 103 short by the receiver 102, thereby supporting a decision to increase rates of data transmission above the rate of the recently achieved rate of data transmission associated with the recently used set of communication parameters of the previous transmission 103pre. In some embodiments, the transmitter 101 transmits to the receiver 102, a long transmission 103long using a second set of communication parameters operative to facilitate a second rate of data transmission that is higher than the recently achieved rate of data transmission, but is lower than the rate of data transmission associated with the short transmission 103short, thereby statistically facilitating a substantially error-free reception of the long transmission 103long by the receiver 102.

In a first alternative embodiment of the method just described for calibrating rates at which data is transmitted in a communication system 100, the method further includes the recently used set of communication parameters 401recent, the second set of communication parameters 401second, and the first set of communication parameters 401first, respectively, are three consecutive entries in a list 400 comprising entries of sets of communication parameters, wherein each entry in the list 400 comprises a set of communication parameters associated with a rate of data transmission that is higher than a rate of data transmission associated with a previous entry in the list 400, if such previous entry exists.

In a first possible configuration of the first alternative embodiment just described, the method further includes the set of communication parameters comprises the three communication parameters of modulation level 410, code rate 411, and antenna usage scheme 412, such that using a combination of these three communication parameters of each entry results in data transmission rates that are higher than data transmission rates resulting from using a combination of the three parameters of a previous entry.

In one possible variation of the first possible configuration of the first alternative embodiment just described, the method further includes at least two of the entries 420transition in the list 400 are consecutive and represent a transition between an antenna usage scheme 412 that is either single-input single-output (SISO) or space time code (STC), and an antenna usage scheme 412 that is multiple-input multiple-output (MIMO).

In one possible variation of the first possible configuration of the first alternative embodiment just described, the method further includes during the transition, either the modulation level 410 or the code rate 411, or both the modulation level 410 and code rate 411, are decreased in order to assist with activation of the multiple-input multiple-output antenna scheme 412.

In a second possible configuration of the first alternative embodiment just described, the method further includes during transitions between two sets of communication parameters associated with a constant antenna usage scheme 412, either modulation level 410, or code rate 411, or both modulation level 410 and code rate 412, are increased, in order to facilitate an increase in rate of data transmission.

In a second alternative embodiment of the method just described for calibrating rates at which data is transmitted in a communication system 100, the method further includes each of the first and the recently used sets of communication parameters is a modulation level 410.

In a third alternative embodiment of the method just described for calibrating rates at which data is transmitted in a communication system 100, the method further includes each of the first and the recently used the sets of communication parameters is a code rate 411.

In a fourth alternative embodiment of the method just described for calibrating rates at which data is transmitted in a communication system 100, the method further includes each of the first and the recently used sets of communication parameters is an antenna usage scheme 412.

In a fifth alternative embodiment of the method just described for calibrating rates at which data is transmitted in a communication system 100, the method further includes each of the first and recently used sets of communication parameters is a sub-channelization usage scheme, in which increasing the number of sub-channels used increases the rates of data transmissions.

In a first possible configuration of the fifth alternative embodiment just described, the method further includes increasing the number of sub-channels used is done in conjunction with lowering the transmission power per sub-channel.

In a second possible configuration of the fifth alternative embodiment just described, the method further includes increasing the number of sub-channels used is done in conjunction with lowering the transmission power.

In a sixth alternative embodiment of the method described for calibrating rates at which data is transmitted in a communication system 100, the method further includes transmitting the long transmission 103long starts before the system determines that there are substantially no errors associated with reception of the short transmission 103short, such that the determination that there are substantially no errors occurs during the long transmission 103long.

Figure 5:
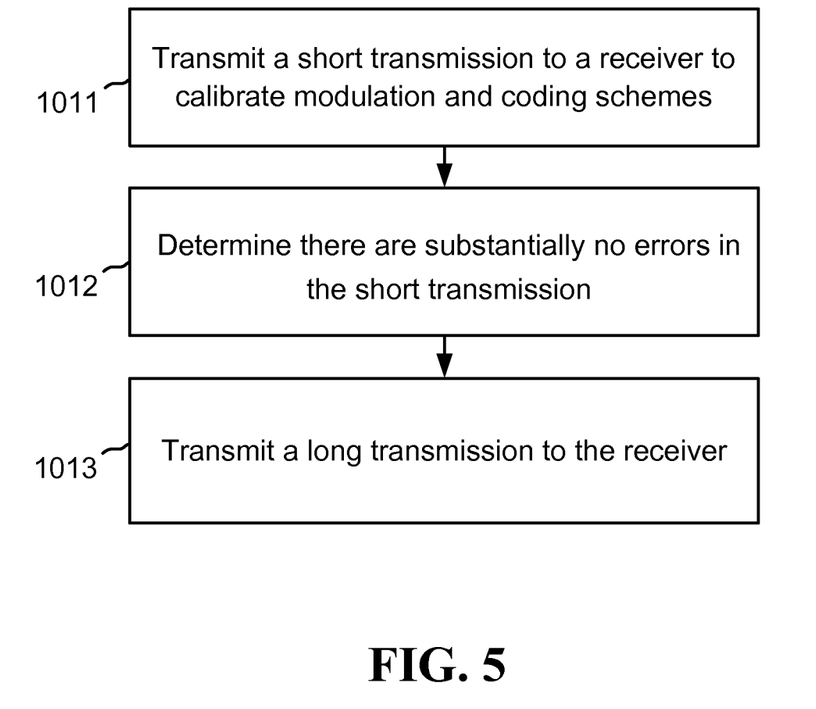
FIG. 5 illustrates one embodiment of a method for calibrating modulation and coding schemes in a communication system.

FIG. 5 illustrates one embodiment of a method for calibrating modulation and coding schemes in a communication system 100. In step 1011, a transmitter 101 transmits to a receiver 102, a short transmission 103short using a first modulation and coding scheme 303mcs that is two levels above a recently used modulation and coding scheme 301mcs known to have produced stable communication between the transmitter 101 and the receiver 102. In step 1012, the communication system 100 determines that there are substantially no errors associated with reception of the short transmission 103short by the receiver 102, thereby supporting a decision to increase modulation and coding scheme of following transmissions above the recently used modulation and coding scheme 301mcs known to have produced stable communication between the transmitter 101 and the receiver 102. In step 1013, the transmitter 101 transmits to the receiver 102, a long transmission 103long having a second modulation and coding scheme 302mcs that is only one level above the recently used modulation and coding scheme 301mcs known to have produced stable communication between the transmitter 101 and the receiver 102, thereby statistically facilitating a substantially error-free reception of the long transmission 103long by the receiver 102.

In one alternative embodiment of the method just described for calibrating modulation and coding schemes in a communication system 100, the chronological order of the steps is step 1011, then step 1012, then step 1013. In one alternative embodiment of the method just described for calibrating modulation and coding schemes in a communication system 100, the chronological order of the steps is step 1011, then step 1013, then step 1012.

Figure 6:
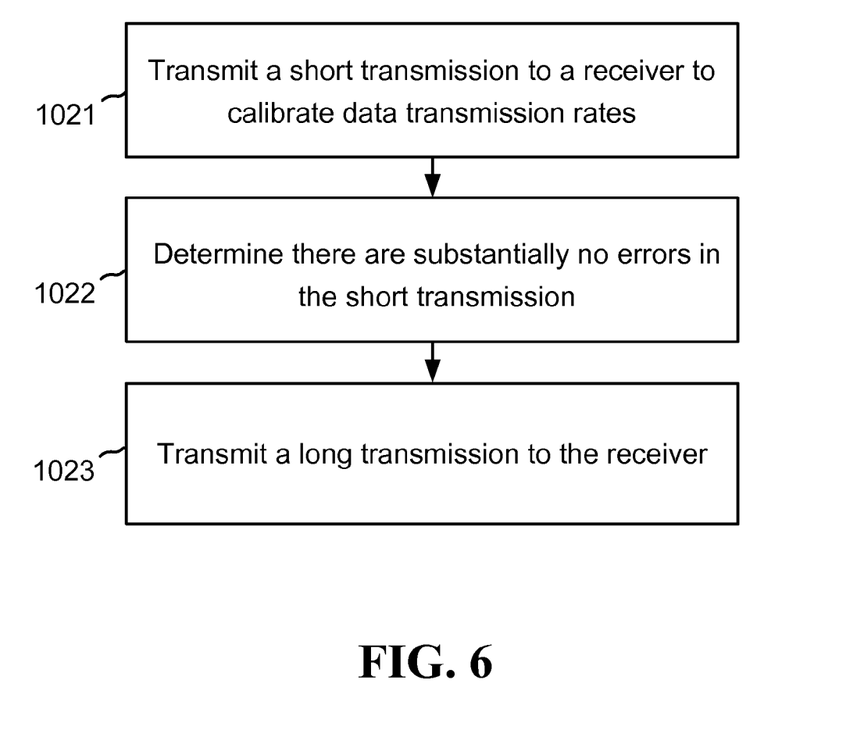
FIG. 6 illustrates one embodiment of a method for calibrating rates at which data is transmitted in a communication system.

FIG. 6 illustrates one embodiment of a method for calibrating rates at which data is transmitted in a communication system 100. In step 1021, a transmitter 101 transmits to a receiver 102, a short transmission 103short created utilizing a first set of two communication parameters that are different than a previous set of two communication parameters recently utilized in creation of stable communication between the transmitter 101 and the receiver 102, wherein each of the two communication parameters of the first set is operative to increase rates at which data is transmitted from the transmitter 101 to the receiver 102. In step 1022, the communication system 100 determines that there are substantially no errors associated with reception of the short transmission 103short by the receiver 102, thereby supporting a decision to increase rates at which data is transmitted in following transmissions. In step 1023, the transmitter 101 transmits to the receiver 102, a long transmission 103long created utilizing a second set of two communication parameters, wherein (i) first of the communication parameters of the second set is equal to the first of the communication parameter of the first set, but (ii) the second of the communication parameter of the second set is equal to the second of the communication parameter of the previous set, thereby statistically facilitating an error-free reception of the long transmission 103long by the receiver 102.

In one alternative embodiment of the method just described for calibrating rates at which data is transmitted in a communication system 100, the chronological order of the steps is step 1021, then step 1022, then step 1231. In one alternative embodiment of the method just described for calibrating modulation and coding schemes in a communication system 100, the chronological order of the steps is step 1021, then step 1023, then step 1022.

Figure 7:
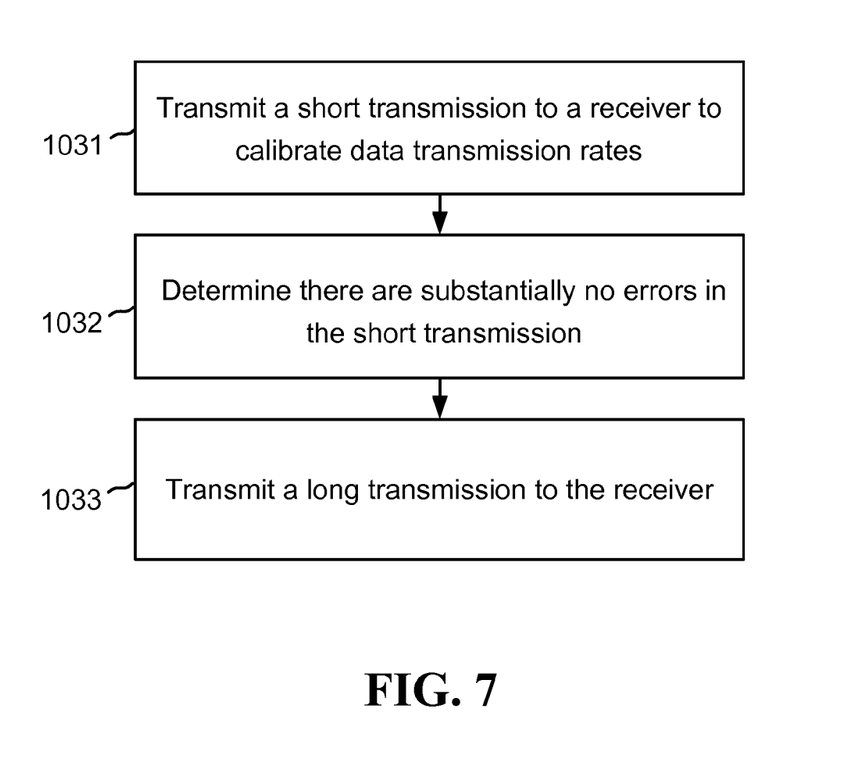
FIG. 7 illustrates one embodiment of a method for calibrating rates at which data is transmitted in a communication system.

FIG. 7 illustrates one embodiment of a method for calibrating rates at which data is transmitted in a communication system 100. In step 1031, a transmitter 101 transmits to a receiver 102, a short transmission 103short using a first set of communication parameters operative to facilitate a first rate of data transmission that is higher than recently achieved rate of data transmission associated with a recently used set of communication parameters of a previous transmission 103pre. In step 1032, the communication system 100 determines that there are substantially no errors associated with reception of the short transmission 103short by the receiver 102, thereby supporting a decision to increase rates of data transmission above the rate of the recently achieved rate of data transmission associated with a recently used set of communication parameters of a previous transmission 103pre. In step 1033, the transmitter 101 transmits to the receiver 102, a long transmission 103long using a second set of communication parameters operative to facilitate a second rate of data transmission that is higher than the recently achieved rate of data transmission, but is lower than the rate of data transmission associated with the short transmission 103short, thereby statistically facilitating a substantially error-free reception of the long transmission 103long by the receiver 102.

In one alternative embodiment of the method just described for calibrating rates at which data is transmitted in a communication system 100, the chronological order of the steps is step 1031, then step 1032, then step 1233. In one alternative embodiment of the method just described for calibrating modulation and coding schemes in a communication system 100, the chronological order of the steps is step 1031, then step 1033, then step 1032.

In this Detailed Description, numerous specific details are set forth. However, the embodiments of the invention may be practiced without some of these specific details. In other instances, well-known hardware, software, materials, structures and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to cover also the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications and variations will be apparent to those skilled in the art. It is to be understood that other embodiments may be utilized and structural changes may be made without departing from the scope of the embodiments. Accordingly, it is intended to embrace all such alternatives, modifications and variations that fall within the spirit and scope of the appended claims and their equivalents.

What is claimed is:

1. A method for calibrating modulation and coding schemes in a communication system, comprising:
  transmitting, by a transmitter, to a receiver, a short transmission using a first modulation and coding scheme that is two levels above a recently used modulation and coding scheme known to have produced stable communication between said transmitter and said receiver;
  determining that there are substantially no errors associated with reception of the short transmission by the receiver, thereby supporting a decision to increase modulation and coding scheme of following transmissions above the recently used modulation and coding scheme known to have produced stable communication between said transmitter and said receiver; and
  transmitting, by the transmitter, to the receiver, a long transmission having a second modulation and coding scheme that is only one level above the recently used modulation and coding scheme known to have produced stable communication between said transmitter and receiver, thereby statistically facilitating a substantially error-free reception of the long transmission by the receiver.

2. The method of claim 1, further comprising:
  determining that there is at least one error associated with reception of the short transmission by the receiver; and
  consequently transmitting, by the transmitter, to the receiver, an extended transmission having a second modulation and coding scheme that is only one level above the recently used modulation and coding scheme known to have produced stable communication between said transmitter and receiver, wherein said extended transmission has a longer period than the long transmission, thereby forcing the transmitter to wait longer before trying to increase again the modulation and coding scheme.

3. The method of claim 2, further comprising:
  determining that there are substantially no errors associated with reception of the extended transmission by the receiver;
  transmitting, by the transmitter, to the receiver, a following short transmission using a third modulation and coding scheme that is two levels above the modulation and coding scheme of the extended transmission;
  determining that there are substantially no errors associated with reception of the following short transmission by the receiver, thereby supporting a decision to increase modulation and coding scheme of following transmissions; and
  transmitting, by the transmitter, to the receiver, a following long transmission having the first modulation and coding scheme that is only one level above the modulation and coding scheme of the extended transmission, thereby statistically facilitating an error-free reception of the following long transmission by the receiver.

4. The method of claim 1, wherein:
  (i) the modulation of the first modulation and coding scheme is one level above the modulation of the recently used modulation and coding scheme known to have produced stable communication between said transmitter and receiver, and (ii) the coding of the first modulation and coding scheme is one level above the coding of the recently used modulation and coding scheme known to have produced stable communication between said transmitter and receiver, in such a manner that the first modulation and coding scheme that is two levels above the recently used modulation and coding scheme known to have produced stable communication between said transmitter and receiver.

5. The method of claim 4, wherein the modulation of the first modulation and coding scheme is quadrature phase shift keying (QPSK), and the modulation of the recently used modulation and coding scheme known to have produced stable communication between said transmitter and receiver is binary phase shift keying (BPSK).

6. The method of claim 4, wherein the coding of the first modulation and coding scheme is of rate two thirds, and the coding of the recently used modulation and coding scheme known to have produced stable communication between said transmitter and receiver is of rate one half.

7. The method of claim 4, wherein the modulation of the first modulation and coding scheme is 16 quadrature amplitude modulation (QAM-16), and the modulation of the recently used modulation and coding scheme known to have produced stable communication between said transmitter and receiver is quadrature phase shift keying (QPSK).

8. The method of claim 4, wherein the coding of the first modulation and coding scheme is of rate three quarters, and the coding of the recently used modulation and coding scheme known to have produced stable communication between said transmitter and receiver is of rate two thirds.

9. The method of claim 4, wherein the modulation of the first modulation and coding scheme is 64 quadrature amplitude modulation (QAM-64), and the modulation of the recently used modulation and coding scheme known to have produced stable communication between said transmitter and receiver is 16 quadrature amplitude modulation (QAM-16).

10. The method of claim 4, wherein the coding of the first modulation and coding scheme is of rate five sixth, and the coding of the recently used modulation and coding scheme known to have produced stable communication between said transmitter and receiver is of rate three quarters.

11. The method of claim 1, wherein the step of transmitting the long transmission starts before the step of determining that there are substantially no errors associated with reception of the short transmission, such that the determination that there are substantially no errors occurs during the long transmission.

12. The method of claim 11, further comprising: not extending a period of the long transmission, as a result of the determination that there are substantially no errors associated with reception of the short transmission.

13. The method of claim 12, further comprising: transmitting, by the transmitter, to the receiver, a second short transmission using a third modulation and coding scheme that is two levels above the modulation and coding scheme of the long transmission, thereby starting a process operative to increase, again, modulation and coding schemes of said communication system.

14. The method of claim 12, further comprising: determining that there is at least one error associated with reception of the long transmission; and lowering the modulation and coding scheme associated with following transmissions.

15. The method of claim 11, further comprising: extending a period of the long transmission, thereby creating an extended transmission, as a result of failure to determine that there are substantially no errors associated with reception of the short transmission.

16. The method of claim 15, further comprising: transmitting, by the transmitter, to the receiver, a second short transmission using a third modulation and coding scheme that is two levels above the modulation and coding scheme of the extended transmission, thereby starting a process operative to increase, again, modulation and coding schemes of said communication system.

17. The method of claim 15, further comprising: determining that there is at least one error associated with reception of the extended transmission; and
lowering the modulation and coding scheme associated with following transmissions.

18. A method for calibrating modulation and coding schemes in a communication system, comprising:
transmitting, by a transmitter, to a receiver, a short transmission using a first modulation and coding scheme that is two levels above a recently used modulation and coding scheme known to have produced stable communication between said transmitter and said receiver;
determining that there is at least one error associated with reception of the short transmission by the receiver; and
consequently transmitting, by the transmitter, to the receiver, a long transmission having a second modulation and coding scheme that has a same level as the modulation and coding scheme known to have produced stable communication between said transmitter and receiver, thereby statistically not risking transmission at a modulation and coding scheme that would have resulted in an error.

19. A method for calibrating modulation and coding schemes in a communication system, comprising:
transmitting, by a transmitter, to a receiver, a short transmission using a first modulation and coding scheme that is two levels above a recently used modulation and coding scheme known to have produced stable communication between said transmitter and said receiver;
determining that there are substantially no errors associated with reception of the short transmission by the receiver, thereby supporting a decision to increase modulation and coding scheme of following transmissions above the recently used modulation and coding scheme known to have produced stable communication between said transmitter and said receiver;
transmitting, by the transmitter, to the receiver, a long transmission having a second modulation and coding scheme that is only one level above the recently used modulation and coding scheme known to have produced stable communication between said transmitter and receiver, thereby statistically facilitating a substantially error-free reception of the long transmission by the receiver; and
repeating successively the steps of
(i) transmitting said short transmission,
(ii) determining that there are substantially no errors,
(iii) transmitting said long transmission,
until a substantially optimal modulation and coding scheme is reached.

* * * * *